(12) United States Patent
Gagliano

(10) Patent No.: US 12,090,920 B2
(45) Date of Patent: Sep. 17, 2024

(54) SYSTEMS AND METHODS FOR DEPLOYING WARNING DEVICES

(71) Applicant: Kodiak Robotics, Inc., Mountain View, CA (US)

(72) Inventor: Joseph Gagliano, Santa Clara, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 112 days.

(21) Appl. No.: 17/816,176

(22) Filed: Jul. 29, 2022

(65) Prior Publication Data

US 2024/0034225 A1    Feb. 1, 2024

(51) Int. Cl.
*B60Q 1/50* (2006.01)
*B60Q 1/46* (2006.01)
*B60Q 1/52* (2006.01)
*B60Q 7/00* (2006.01)

(52) U.S. Cl.
CPC ............... *B60Q 1/507* (2022.05); *B60Q 1/46* (2013.01); *B60Q 1/52* (2013.01); *B60Q 7/00* (2013.01)

(58) Field of Classification Search
CPC . B60Q 7/00; B60Q 7/507; B60Q 7/52; B60Q 7/46
See application file for complete search history.

(56) References Cited

U.S. PATENT DOCUMENTS

| | | | | |
|---|---|---|---|---|
| 6,056,498 A * | 5/2000 | Velinsky | .................... | E01F 9/70 414/501 |
| 6,183,042 B1 * | 2/2001 | Unrath | ..................... | E01F 9/70 296/183.1 |
| 6,969,185 B1 * | 11/2005 | Adair | ........................ | G09F 7/00 362/486 |
| 7,108,446 B2 * | 9/2006 | Clark | ...................... | E01F 9/654 414/467 |
| 7,581,918 B2 * | 9/2009 | Jordan | ...................... | E01F 9/70 198/315 |
| 8,500,360 B1 * | 8/2013 | Jones | ........................ | E01F 9/70 404/9 |
| 8,655,546 B2 * | 2/2014 | Natori | .................... | G08G 1/166 701/70 |
| 9,437,109 B1 * | 9/2016 | Stafford | .................. | B60Q 7/00 |

(Continued)

OTHER PUBLICATIONS

U.S. Appl. No. 17/816,180 filed Jul. 29, 2022.

(Continued)

*Primary Examiner* — Hoi C Lau
(74) *Attorney, Agent, or Firm* — Michele V. Frank; Venable LLP

(57) ABSTRACT

Systems and methods for deploying warning devices for a vehicle. The vehicle can be an autonomous vehicle. A method of deploying warning devices for a vehicle includes deploying one or more warning devices from the vehicle, the one or more warning devices being coupled to a deployment vehicle. Deploying the one or more warning devices includes controlling the deployment vehicle. A system for deploying warning devices for a vehicle includes a deployment vehicle and one or more warning devices coupled to the deployment vehicle. The system includes a controller configured to deploy the one or more warning devices from the vehicle. Deploying the one or more warning devices includes the controller configured to control the deployment vehicle.

28 Claims, 8 Drawing Sheets

(56) References Cited

U.S. PATENT DOCUMENTS

| | | | | |
|---|---|---|---|---|
| 9,940,839 B2* | 4/2018 | Stafford | | E01F 9/615 |
| 10,319,227 B2* | 6/2019 | Roy | | G08G 1/0955 |
| 11,008,717 B2* | 5/2021 | Roy | | B62D 33/02 |
| 11,396,256 B2* | 7/2022 | York | | B62D 65/024 |
| 11,408,138 B2* | 8/2022 | Roy | | B60P 3/14 |
| 11,795,638 B2* | 10/2023 | Roy | | E01F 15/148 |
| 2004/0253085 A1* | 12/2004 | Smith, Jr. | | B60P 3/07 |
| | | | | 414/469 |
| 2005/0095105 A1* | 5/2005 | Parks | | E01F 9/70 |
| | | | | 414/540 |
| 2005/0199640 A1* | 9/2005 | Clark | | E01F 9/688 |
| | | | | 221/199 |
| 2006/0054461 A1* | 3/2006 | Jordan | | E01F 9/70 |
| | | | | 198/602 |
| 2009/0200415 A1* | 8/2009 | Pessach | | F41H 11/11 |
| | | | | 242/593 |
| 2011/0068602 A1* | 3/2011 | Burrows | | B62D 35/001 |
| | | | | 296/180.1 |
| 2011/0084516 A1* | 4/2011 | Smith | | B62D 35/001 |
| | | | | 296/180.4 |
| 2013/0076068 A1* | 3/2013 | Wayburn | | B62D 35/004 |
| | | | | 296/180.1 |
| 2018/0195246 A1* | 7/2018 | Hanssen | | G08B 5/006 |
| 2018/0261088 A1* | 9/2018 | Roy | | E01F 15/148 |
| 2019/0220026 A1 | 7/2019 | Vawter et al. | | |
| 2019/0330811 A1* | 10/2019 | Roy | | E01F 9/70 |
| 2020/0125089 A1* | 4/2020 | Matsumoto | | B60Q 1/507 |
| 2020/0276927 A1* | 9/2020 | York | | B60R 9/06 |
| 2020/0332484 A1* | 10/2020 | Roy | | E01F 9/662 |
| 2021/0155154 A1 | 5/2021 | Wheeler et al. | | |
| 2021/0269995 A1* | 9/2021 | Roy | | E01F 15/148 |
| 2021/0373575 A1 | 12/2021 | Manjunath et al. | | |
| 2022/0001798 A1* | 1/2022 | Price | | E01F 9/654 |
| 2022/0144166 A1* | 5/2022 | Hamm | | B64U 50/38 |
| 2022/0144185 A1 | 5/2022 | Burnette et al. | | |
| 2022/0171389 A1* | 6/2022 | Strobel | | B60W 40/072 |
| 2022/0317690 A1* | 10/2022 | Vawter | | B60Q 1/525 |
| 2023/0124231 A1 | 4/2023 | Lim | | |
| 2023/0139933 A1 | 5/2023 | Tam | | |

OTHER PUBLICATIONS

Non-Final Office Action dated Jul. 14, 2023, directed to U.S. Appl. No. 17/816,180; 29 pages.

Final Office Action dated Dec. 5, 2023, directed to U.S. Appl. No. 17/816,180; 37 pages.

\* cited by examiner

SYSTEMS AND METHODS FOR DEPLOYING WARNING DEVICES

CROSS REFERENCE TO RELATED APPLICATIONS

The present application is related to co-pending U.S. application Ser. No. 17/816,180, filed Jul. 29, 2022, the entire contents of which is hereby incorporated by reference in its entirety.

TECHNICAL FIELD

The present disclosure relates to systems and methods for deploying warning devices for a vehicle, including an autonomous vehicle.

BACKGROUND

Vehicles, such as cars, trucks, motorcycles, or the like, may encounter situations in which the vehicle needs to pull over and stop on a road or on the shoulder of the road. For example, a component of the vehicle may fail or otherwise may stop working, and the vehicle needs to be pulled over out of traffic for safety. When the vehicle stops on the road or the side of the road, triangles or flares, for example, may be required to be setup about the vehicle to notify other road users of the stopped vehicle so as to prevent crashes and accidents.

BRIEF SUMMARY

A method of deploying warning devices for a vehicle includes deploying one or more warning devices from the vehicle, the one or more warning devices being coupled to a deployment vehicle. Deploying the one or more warning devices includes controlling the deployment vehicle.

A system for deploying warning devices for a vehicle. The system comprises a deployment vehicle, one or more warning devices coupled to the deployment vehicle, and a controller configured to: deploy the one or more warning devices from the vehicle, wherein deploying the one or more warning devices includes the controller configured to control the deployment vehicle.

A vehicle comprising a warning device deployment system. The warning device deployment system comprising a deployment vehicle, one or more warning devices coupled to the deployment vehicle, and a controller configured to: deploy the one or more warning devices from the vehicle, wherein deploying the one or more warning devices includes the controller configured to control the deployment vehicle.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
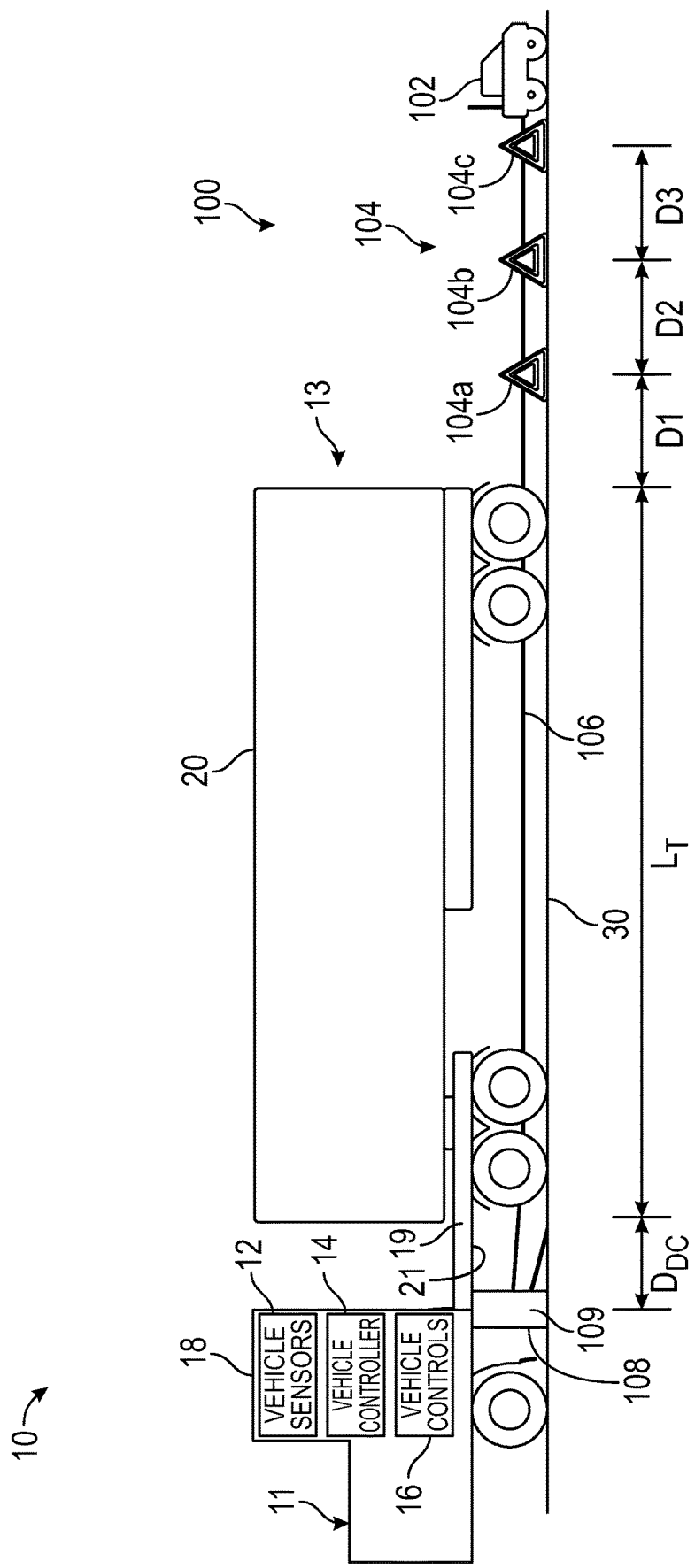
FIG. 1 illustrates a schematic, side view of an autonomous vehicle including a warning device deployment system, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "forward" and "rearward" refer to relative positions of a vehicle. For example, forward refers to a position closer to front hood, front bumper, or front fender of the vehicle and rearward refers to a position closer to a rear bumper, rear trunk, or trailer of the vehicle.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

As used herein, "automated," "autonomous," or "automatic," are used to describe functions that are done without user intervention (e.g., by a controller).

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

When a vehicle stops on the road or the side of the road for various reasons, especially, when the stop may be unexpected, unplanned and/or not a necessary traffic stop (e.g., a routine stop at a traffic light or a stop sign), warning devices, such as warning triangles, flares, lights, or the like, may be required to be setup about the vehicle to notify other road users of the stopped vehicle for safety, for example, to prevent crashes and accidents. When a human operator gets out of the vehicle to setup the warning devices, the human operator may be in danger of being hit or stuck by another vehicle on the road. Further, when the vehicle is an autonomous vehicle (e.g., a vehicle that operates without a human in the vehicle), it is challenging to adequately warn or notify other road users of the stopped vehicle without a human present at the vehicle to deploy warning devices.

An autonomous vehicle is a vehicle that incorporates vehicular automation and that can sense the environment around the vehicle and can operate with little to no human input. Autonomous vehicles include various sensors to sense the environment. Control systems interpret the sensor information to identify navigation paths and to automatically control the autonomous vehicle. Autonomous vehicles include one or more sensors that gather data and information, communicate with the autonomous vehicle, and may assist in navigating the autonomous vehicle. The one or more sensors may include a plurality of redundant sensors (e.g., multiple sensors of the same type that measure the same type of data). One or more vehicle controllers receive the data and information from the one or more sensors to autonomously control and navigate the autonomous vehicle. For example, the one or more vehicle controllers control one or more control systems (e.g., steering, power, throttle, brakes, etc.) of the autonomous vehicle to control the autonomous vehicle. In some instances, the autonomous vehicle may encounter an emergency such that the autonomous vehicle needs to stop. For example, the one or more vehicle controllers may detect a fault in the one or more sensors, in the one or more control systems, or in the vehicle controllers themselves, or a component on the vehicle may fail or otherwise become damaged. In such instances, the autonomous vehicle can initiate a fallback plan to stop the autonomous vehicle (e.g., either in the current traffic lane or on the shoulder of the road).

When the vehicle or the autonomous vehicle stops for an extended period of time (e.g., longer than ten minutes) for any reason other than a necessary traffic stop, warning devices (e.g., warning triangles, flares, lights, etc.) need to be placed on the road within a predetermined amount of time (e.g., ten minutes) to notify other road users of the stopped vehicle so as to prevent accidents. When the vehicle is operated by a human operator, such a requirement places the human operator at risk in placing the warning devices and the warning devices may fall over, and thus may be ineffective. Further, when the vehicle is operated without a human operator in the vehicle (e.g., the vehicle is an autonomous vehicle), there remains a need to deploy the warning devices without a human being present at the vehicle. Accordingly, the present disclosure provides systems and methods for deploying warning devices for a vehicle, including an autonomous vehicle.

Embodiments of the present disclosure provide for a warning device deployment system. The warning device deployment system includes a remote controlled device and warning devices housed on the vehicle for deployment. The remote controlled device can be a remote controlled (RC) vehicle (e.g., an RC car) and warning devices housed in a deployment case on the vehicle. The warning device deployment system can be referred to as nested emergency safety triangles (NEST). The deployment case can be attached the undercarriage of the vehicle. When the vehicle experiences an emergency pull-over or stop in lane (e.g., the vehicle initiates a fallback plan), the warning device deployment system deploys the warning devices onto the road to setup the warning devices at predetermined distances from the vehicle. The RC vehicle can pull the warning devices out behind the vehicle to the predetermined distance. A wire that is connected from the vehicle to the RC vehicle provides power and controls for the RC vehicle. The warning devices can be attached to the wire. The RC vehicle can include front and rear mounted cameras to assist in navigating the RC vehicle to deploy the warning devices. When the warning devices are no longer needed (e.g., the emergency has been resolved), the wire can be retracted to retract and store the warning devices and the RC vehicle for future use.

The deployment case stows the warning devices, the RC vehicle, and the wire when the warning device deployment system is not in use. The deployment case can be tightly sealed when the deployment case is closed to secure and to protect the components of the warning device deployment system (e.g., the warning devices, the RC vehicle, the wire, and electronic components of the warning device deployment system) from wear and tear and can help to keep the components clean by preventing road grime, dirt, mud, or other debris from entering the deployment case when the deployment case is closed.

The RC vehicle can be deployed whenever the vehicle is stopped for any reason other than a necessary traffic stop and when the autonomous vehicle is stationary for a predetermined period of time (e.g., for at least ten minutes). The RC vehicle can be controlled by a remote operator (e.g., a human at a remote location from the autonomous vehicle) or can be controlled automatically by the vehicle controllers of the vehicle. Cameras or other sensors on the vehicle and/or on the RC vehicle are used for controlling and navigating the RC vehicle to deploy and to retract the warning devices. The warning devices can prop themselves up. While reference is made herein to an autonomous vehicle, the embodiments of the present disclosure may be used for any type of vehicle including vehicles operated by a human operator.

The systems and methods of the present disclosure provide for stopping an autonomous vehicle when the autonomous vehicle triggers an emergency. An emergency can be any type of system or vehicle fault or failure on the autonomous vehicle (e.g., faults in the sensors, the controllers, or the software of the autonomous vehicle, or damage or faults in the components of the vehicle, such as a blown tire, engine failure, or damage to other components of the vehicle). While reference is made to an emergency, the autonomous vehicle can stop the warning devices can be deployed for any reason. When the autonomous vehicle is in an emergency or otherwise needs to stop for safety reasons, the autonomous vehicle can initiate a fallback plan to stop the autonomous vehicle. The fallback plan includes actions taken by the autonomous vehicle to stop the autonomous vehicle at a moment when the emergency is detected. For example, the fallback plan can include a stopping maneuver (e.g., steering, application of the brakes, engine braking, etc.) to safely stop the autonomous vehicle either in the road or on a shoulder of the road.

When the autonomous vehicle is stopped, the warning device deployment system can open and deploy the warning devices by controlling the RC vehicle. The warning devices can be deployed for as long as necessary until the emergency has been resolved or the autonomous vehicle no longer needs to be stopped. When the emergency has been resolved (or the autonomous vehicle otherwise no longer needs to be stopped), the warning device deployment system can retract the warning devices and the RC vehicle and stow the warning devices and the RC vehicle in the deployment case while the autonomous vehicle is operating. In this way, the warning device deployment system can deploy the warning devices again if needed.

When the warning devices are needed (e.g., during an emergency or any other reason), the deployment case can drop down and the warning device deployment system can deploy the RC vehicle to move (e.g., drag, slide, roll, etc.) the warning devices to the predetermined distances from the autonomous vehicle. The warning device deployment system can generate a deployment path for the RC vehicle to follow based on a vehicle path of the autonomous vehicle. For example, the warning device deployment system can determine the steering of the autonomous vehicle, can determine a curvature of the road, can determine a slope (e.g., incline angle or decline angle) of the road, and can detect any objects in the road. In some examples, the vehicle path of the autonomous vehicle includes a stopping maneuver and the warning device deployment system can generate the deployment path for the RC vehicle to follow based on the stopping maneuver. For example, the warning device deployment system can determine the steering of the autonomous vehicle while the autonomous vehicle is stopping, can determine a curvature of the road while the autonomous vehicle is stopping, can determine a slope of the road while the vehicle is stopping, and can detect any objects in the road while the autonomous vehicle is stopping. Based on the vehicle path (and/or the stopping maneuver), the warning device deployment system can generate the deployment path for the RC vehicle and can automatically control the RC vehicle on the deployment path such that the warning devices are setup at the predetermined distance from the autonomous vehicle even if the autonomous vehicle stopped on a curve, the road is curved, the road is sloped, there are objects in the road, etc.

When the warning devices are no longer needed (e.g., the emergency has been resolved or the vehicle no longer needs to be stopped), the warning device deployment system will retract the warning devices and the RC vehicle (e.g., by retracting the wire) into the deployment case via a spool or other retraction mechanism. The deployment case will then close, and the autonomous vehicle can then operate again. The warning device deployment system can remain stowed while the autonomous vehicle operates and can deploy the warning devices and the RC vehicle when the autonomous vehicle triggers an emergency again. In this way, a human does not need to exit their vehicle to deploy the warning devices and/or a human does not need to be present at the autonomous vehicle to deploy the warning devices. Accordingly, the systems and methods of the present disclosure allow the warning devices to be deployed and retracted without the need of a human to physically deploy the warning devices.

Referring now to the drawings, FIG. 1 illustrates a schematic, side view of an autonomous vehicle 10 including a warning device deployment system 100, according to an embodiment of the present disclosure. The autonomous vehicle 10 may be any motor vehicle, such as, for example, but not limited to a car, a truck, a commercial truck, a bus, a watercraft (e.g., boat, ship, underwater vehicles, etc.), a motorcycle, an aircraft (e.g., airplane, helicopter, etc.), or any other type of vehicle. For ease of description, the autonomous vehicle 10 may be referred to herein as a truck. Further, while reference is made to an autonomous vehicle herein, the embodiments of the present disclosure may be used in non-autonomous vehicles (e.g., vehicles controlled manually by a human operator in the vehicle or remote from the vehicle). The autonomous vehicle may have a forward side 11, also referred to as a forward end or a front end, and a rear side 13, also referred to as a rear end, rearward end, or rearward side. The autonomous vehicle 10 includes one or more vehicle sensors 12, a vehicle controller 14, and vehicle controls 16. When the autonomous vehicle 10 is a truck, the autonomous vehicle 10 includes a tractor unit 18 that is configured to support and tow a trailer 20, such as a semitrailer. The tractor unit 18 includes a rear frame 19 for supporting the trailer 20 when the trailer 20 is coupled to the tractor unit 18. The trailer 20 includes a trailer length $L_T$ that is the length of the trailer 20 from a front end of the trailer 20 to a rear end of the trailer 20.

The vehicle sensors 12 may assist in navigation of the autonomous vehicle 10. In some examples, the vehicle sensors 12 may assist in navigation in a manner that results in the autonomous vehicle 10 being autonomous, self-driving, semi-autonomous, non-autonomous with assisted navigation, etc., or combinations thereof. In this regard, the vehicle sensors 12 may include components, such as, but not limited to, sensors or other devices, that may be useful for the operation of the vehicle, or any combination thereof. The autonomous vehicle 10 may use (via the vehicle controller 14) data collected by the vehicle sensors 12 to navigate or to assist in navigating the autonomous vehicle 10 along a road 30 or other ground surface and to control the vehicle controls 16 to control the speed, the direction, the braking, and other functions of the autonomous vehicle 10. By way of example, the vehicle sensors 12 may be, or may include the sensors, cameras, and mirrors, described in U.S. Patent Application Publication No. US2022/0144185, the contents of which are herein incorporated by reference in their entirety. The vehicle sensors 12 may take any form and may be located and mounted at any location on the autonomous vehicle 10, as desired.

The vehicle sensors 12 include a variety of sensors to monitor the surroundings of the autonomous vehicle 10. The sensors may include, for example, but not limited to, one or more cameras, one or more lidars, one or more radars, one or more global positioning systems (GPS), and one or more inertial measurement units (IMUs). The combined data from the sensors may be used by a processor (e.g., the vehicle controller 14) to autonomously (or semi-autonomously) navigate or to assist a driver in navigating the roadway in a variety of light conditions, weather conditions, traffic conditions, load conditions, road conditions, etc. The sensors and the other features of the vehicle sensors 12 are configured and oriented to provide a predetermined field of view and to provide reliable, accurate, and high-quality data for autonomous and semi-autonomous driving. The cameras may include a plurality of cameras including one or more cameras facing the forward side 11, one or more cameras facing the rear side 13, and one or more cameras facing a lateral side perpendicular to the forward side and rear side. In some examples, the cameras may include narrow field of view camera(s), thermal camera(s), wide field of view camera(s), side-facing camera(s), and/or e-mirror camera(s). The aforementioned cameras are merely exemplary, and any number or type of cameras may be included to facilitate the autonomous, semi-autonomous, or assisted navigation of the autonomous vehicle 10, including, the cameras described in U.S. Patent Application Publication No. US2022/0144185.

The lidars, the radars, the GPS, the IMUs, and the cameras all provide information and data to autonomously or semi-autonomously operate and navigate the autonomous vehicle 10 and/or provide information and data to assist in the navigation of the autonomous vehicle 10 where an operator is present inside the cab of the autonomous vehicle 10. For example, the lidars may assist in tracking vehicles or objects passing or being passed by the autonomous vehicle. In an example, the radars may enable the autonomous vehicle to navigate in difficult weather and light conditions. The radars may supplement the information from the cameras and from the lidars, which may have difficulty obtaining clear images and signals in the presence of certain weather conditions, such as fog, rain, and snow. The radars may also provide information regarding objects that are occluded in the camera date and the lidar data. In an example, the cameras may track vehicles or objects and assist in tracking of the vehicles or of the objects. The GPS can provide a geolocation of the autonomous vehicle 10 and can communicate with other GPS systems to provide geolocations of other vehicles around the autonomous vehicle 10. Thus, the vehicle sensors 12 can sense an environment of the autonomous vehicle 10 including, for example, objects around the autonomous vehicle 10, a road on which the autonomous vehicle 10 is operating, curvature of the road, slope of the road, weather conditions, light conditions, and other information regarding the environment about the autonomous vehicle 10.

The vehicle controller 14 sends and/or receives the data from the vehicle sensors 12 and controls the vehicle controls 16. The vehicle controls 16 include systems for controlling operation of the autonomous vehicle 10 to autonomously or semi-autonomously control the autonomous vehicle 10. The systems include, for example, an engine, a steering system, a braking system, and other systems that control operation of the autonomous vehicle 10. The engine may include any type of engine, for example, an internal combustion engine, an electric motor, a hybrid-electric engine, or other types of power units for propelling, for moving, or for powering the autonomous vehicle 10. The vehicle controls 16 include actuators or other devices that control fuel flow, acceleration (e.g., a throttle), steering, braking, or other vehicle controls of the autonomous vehicle 10. Thus, the vehicle controller 14 controls the vehicle controls 16 to propel, move, steer, accelerate, and stop the autonomous vehicle 10, as detailed further below.

The warning device deployment system 100 includes a deployment vehicle 102 and one or more warning devices 104. In the exemplary embodiment, the warning devices 104 include safety triangles. The warning devices 104, however, may include any type of warning device, such as, for example, flares, cones, lights, or the like. The warning devices 104 are coupled to the deployment vehicle 102 via, for example, a wire 106 that is attached to the deployment vehicle 102. For example, the warning devices 104 can be attached and/or tied to the wire 106. In some examples, the wire 106 can be looped through the warning devices 104. In some examples, the wire 106 can include a stopper element that includes a male component and the warning devices 104 can include a corresponding female component such that the male component is inserted into the corresponding female component. The stopper element can be, for example, a knot, a notch, or another type of device that creates a male component on the wire 106. In some examples, the wire 106 can include a plurality of stopper elements that each include a different shape or a different size for being inserted into a corresponding shape or a corresponding size of the female component on the different warning devices 104. For example, each warning device 104 can include a different female component having a different size or a different shape that receives the corresponding stopper element on the wire 106. The wire 106 can be, for example, a rope, a cable, or the like.

Figure 2:
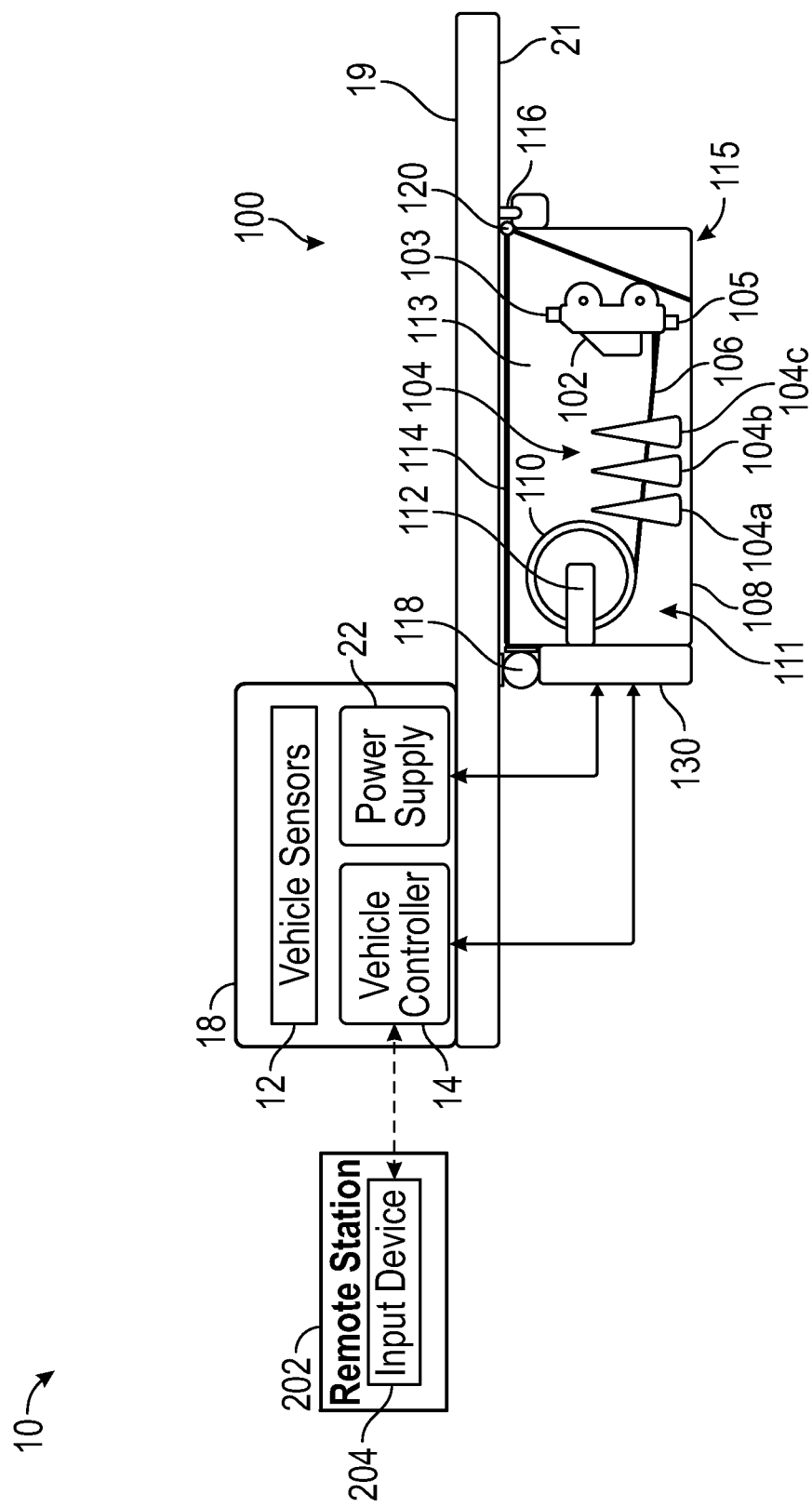
FIG. 2 illustrates a schematic of the warning device deployment system of FIG. 1 in a stowed state, according to an embodiment of the present disclosure.
Figure 5:
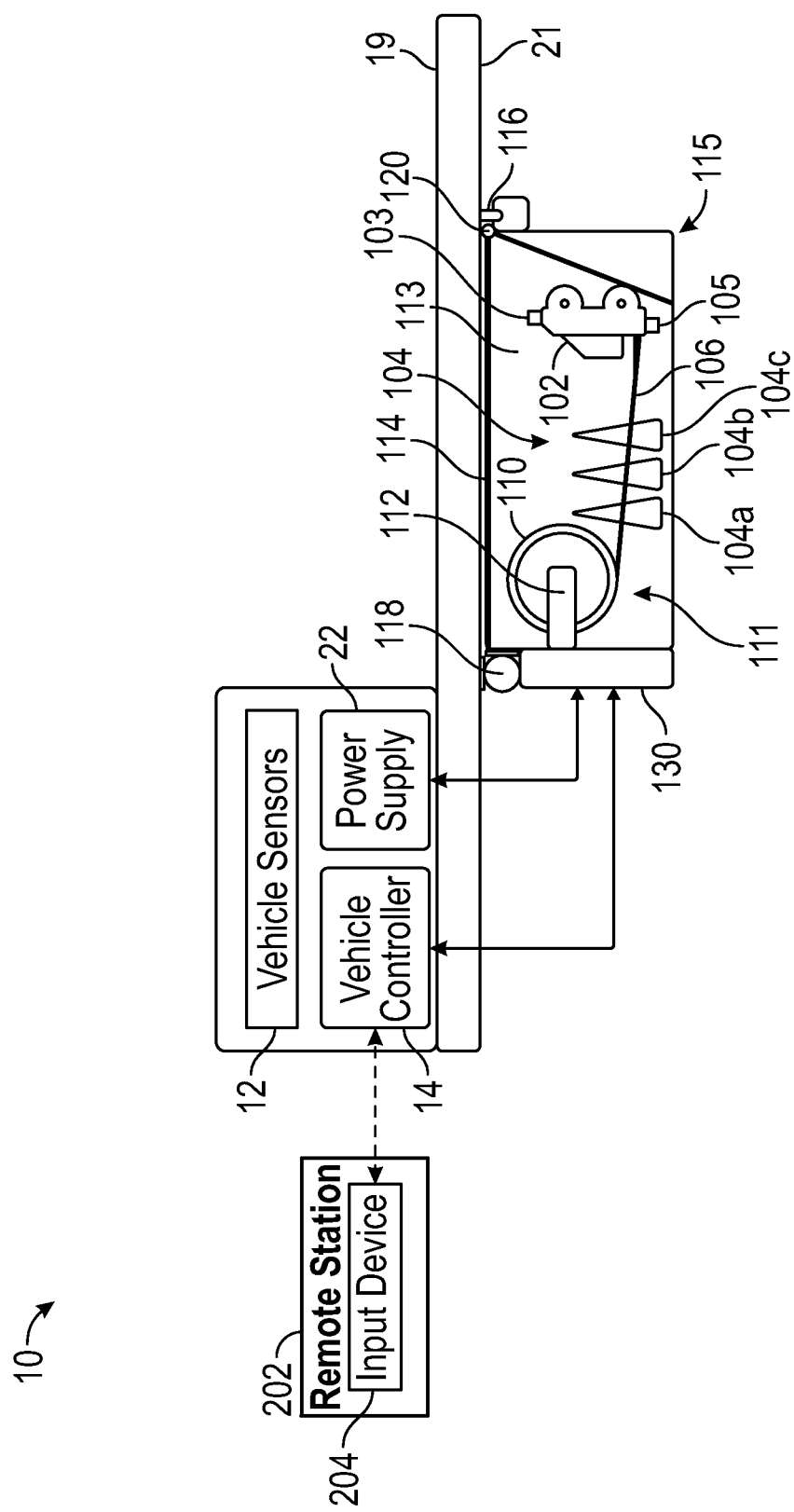
FIG. 5 illustrates a schematic of the warning device deployment system of FIG. 1 in the stowed state, according to an embodiment of the present disclosure.

The deployment vehicle 102, the warning devices 104, and the wire 106 are stowed in a deployment case 108 when the warning device deployment system 100 is not in use (as shown in FIGS. 2 and 5). The deployment case 108 includes a first side wall 109 (an outer surface of the first side wall 109 is shown in FIG. 1). The warning devices 104 can be compacted when stowed in the deployment case 108. For example, the warning devices 104 can be made from a material that compacts or retracts when the warning devices 104 are stowed in the deployment case 108 and that expands when the warning devices 104 are deployed from the deployment case 108. The deployment case 108 is attached to an underside 21 of the autonomous vehicle 10 at a deployment case distance $D_{DC}$ from the trailer 20. For example, the deployment case 108 is attached to the underside 21 of the rear frame 19 of the tractor unit 18. In some examples, the deployment case 108 is attached to an underside of the trailer 20. The deployment case 108 can be attached anywhere on the tractor unit 18 or one the trailer 20 such that the deployment vehicle 102 can deploy the warning devices 104 from the deployment case 108 onto the road 30.

In the exemplary embodiment, the deployment vehicle 102 includes a remote control (RC) vehicle, such as an RC car. The deployment vehicle 102, however, may include any type of remote-control vehicle (e.g., car, boat, aircraft, etc.), as desired. The wire 106 is attached to the deployment vehicle 102. In this way, the warning devices 104 are coupled to the deployment vehicle 102 (e.g., via the wire 106). During operation of the warning device deployment system 100 (i.e., when the warning device deployment system 100 is in use), the deployment vehicle 102 is deployed and controlled (e.g., remotely by a user or autonomously by the autonomous vehicle 10) to move the warning devices 104 to desired locations, as detailed further below. For example, the warning devices 104 can drag, slide, roll, wheel, etc. across the road 30 (e.g., in a lane of the road 30 and/or on a shoulder of the road 30). The warning devices 104 are located at predetermined locations on the wire 106 such that the deployment vehicle 102 moves the warning devices 104 to predetermined distances beyond (e.g., behind) the rear side 13 of the autonomous vehicle 10. For example, the warning devices 104 include a first warning device 104a at a first distance D1, a second warning device 104b at a second distance D2, and a third warning device 104c at a third distance D3. The first distance D1 is a distance from the rear side 13 of the autonomous vehicle 10 to the first warning device 104a when the warning devices 104 are fully deployed. The second distance D2 is a distance from the first warning device 104a to the second warning device 104b when the warning devices 104 are fully deployed. The third distance D3 is a distance from the second warning device 104b to the third warning device 104c when the warning devices 104 are fully deployed. For example, the first distance D1 is approximately ten feet, the second distance D2 is approximately ninety feet, and the third distance D3 is approximately one hundred feet. In this way, the first warning device 104a is deployed at approximately ten feet beyond the rear side 13 of the autonomous vehicle 10, the second warning device 104b is deployed at approximately one hundred feet beyond the rear side 13 of the autonomous vehicle 10, and the third warning device 104c is deployed at approximately two hundred feet beyond the rear side 13 of the autonomous vehicle 10. Thus, the warning devices 104 are deployed at distances as set by safety regulations and without the need of a human at a location of the autonomous vehicle 10 to deploy the warning devices 104. The warning devices 104 can be deployed at any distances, as desired.

FIGS. 2 to 5 illustrate schematic views of various steps of deploying and retracting the warning devices 104. FIGS. 2 to 5 show the tractor unit 18 and the rear frame 19 schematically and the first side wall 109 (FIG. 1) of the deployment case 108 is removed such that an interior 111 of the deployment case 108 is shown in FIGS. 2 to 5. Accordingly, FIGS. 2 to 5 show an interior surface of a second side wall 113 of the deployment case 108. FIG. 2 illustrates a schematic view of the warning device deployment system 100 in a stowed state, according to an embodiment of the present disclosure. FIG. 2 shows the deployment vehicle 102 and the warning devices 104 stowed in the deployment case 108, and the deployment case 108 is closed. When the deployment vehicle 102 and the warning devices 104 are stowed in the deployment case 108, the deployment vehicle 102 and the warning devices 104 are disposed in the interior 111 between the first side wall 109, the second side wall 113, a ramp 114, and a bottom wall 115. The ramp 114 closes the deployment case 108, as detailed further below. When the deployment case 108 is closed, the ramp 114 provides a top wall for the deployment case 108, as shown in FIG. 2.

The deployment vehicle 102 includes one or more deployment vehicle sensors, such as a forward deployment sensor 103 and a rear deployment sensor 105. The forward deployment sensor 103 is a camera oriented to provide a field of view in front of the deployment vehicle 102. The rear deployment sensor 105 is a camera oriented to provide a field of view behind the deployment vehicle 102. The cameras on the deployment vehicle 102 can include any type of camera, such as the cameras of the autonomous vehicle 10 described above with respect to FIG. 1. Accordingly, the deployment vehicle sensors can assist in navigating the deployment vehicle 102, as detailed further below. While the deployment vehicle sensors are depicted as cameras, the deployment vehicle sensors can include any type of sensor for sensing an environment about the deployment vehicle 102, such as, for example, lidars, radars, IMUs, positioning systems, or the like. In some examples, the vehicle sensors 12 of the autonomous vehicle 10 can provide navigational assistance for the deployment vehicle 102, as detailed further below.

The warning device deployment system 100 includes the deployment vehicle 102, the warning devices 104, and the wire 106. When the warning device deployment system 100 is in the stowed state, the wire 106 is wound about a spool 110. The spool 110 includes a spool arm 112. The spool arm 112 is an electro-mechanical device that can be controlled to a neutral position such the deployment vehicle 102 can freely unwind the wire 106 when the deployment vehicle 102 is deploying the warning devices 104, and can be controlled to retract the wire 106, and, thus, retract the deployment vehicle 102 after the deployment vehicle 102 has been deployed, as detailed further below.

Figure 3:
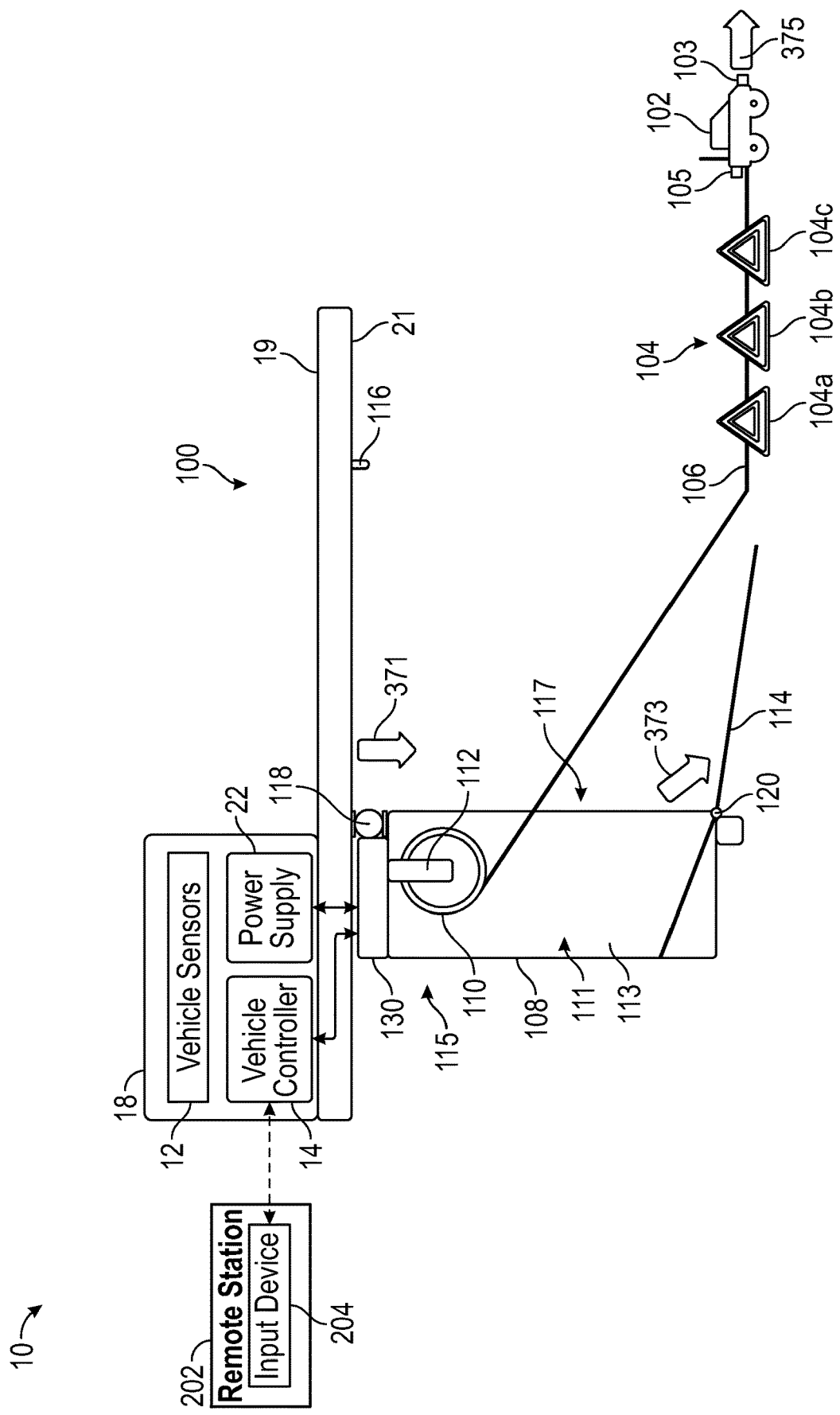
FIG. 3 illustrates a schematic of the warning device deployment system of FIG. 1 in a deploying state, according to an embodiment of the present disclosure.
Figure 4:
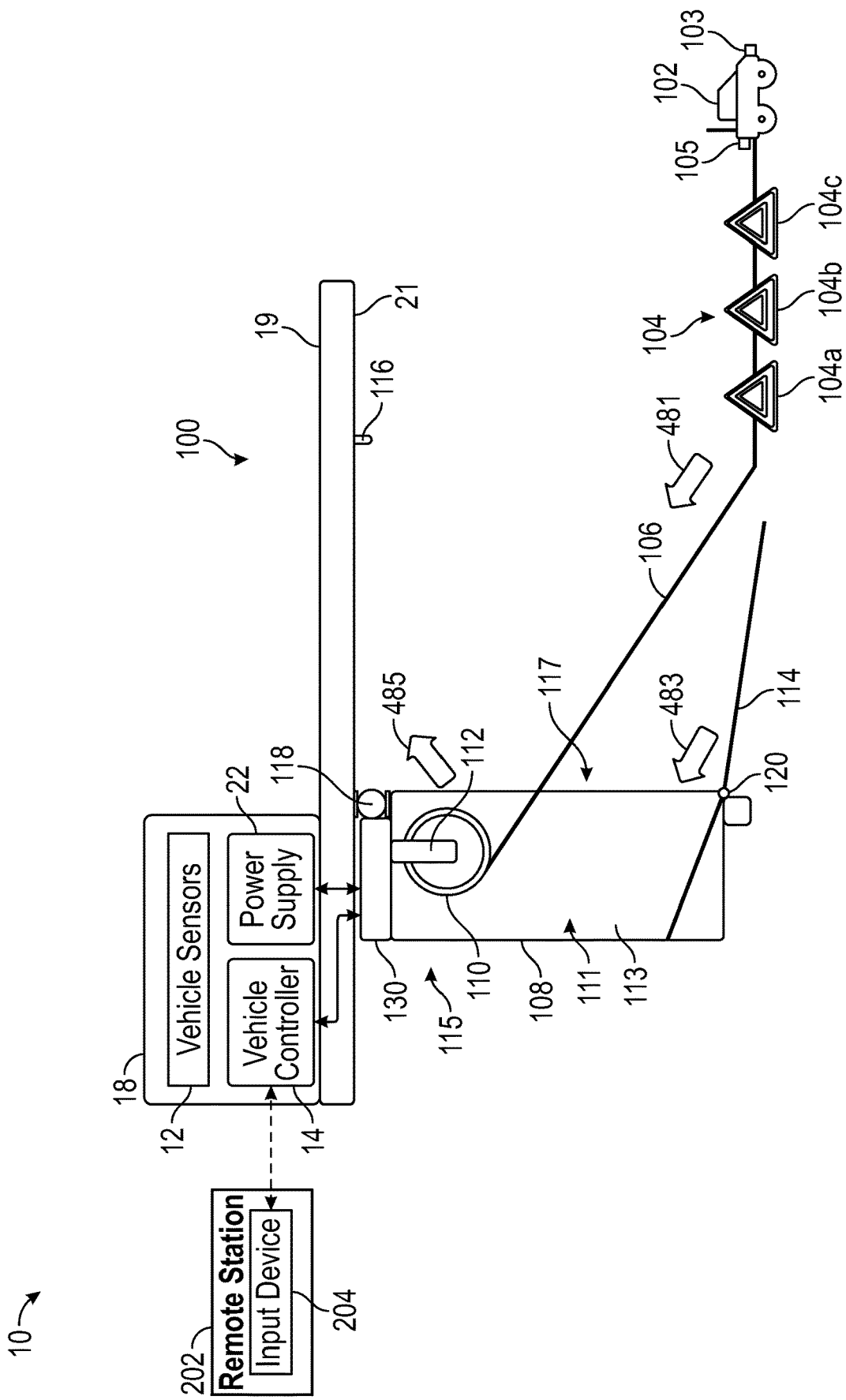
FIG. 4 illustrates a schematic of the warning device deployment system of FIG. 1 in a retracting state, according to an embodiment of the present disclosure.

The warning device deployment system 100 includes the ramp 114 stored in the deployment case 108 when the warning device deployment system 100 is in the stowed state. The ramp 114 can be opened (as shown in FIGS. 3-4) to allow the deployment vehicle 102 to exit the deployment case 108 and deploy the warning devices 104, as detailed further below. In the stowed state, the ramp 114 can provide a portion of the deployment case 108 and can provide a seal for the deployment case 108 such that the components inside of the deployment case 108 are protected from debris (e.g., road grime, mud, dirt, etc.), weather (e.g., rain), or the like.

In this way, when the warning device deployment system 100 is in the stowed state (e.g., the deployment case 108 is closed), the components of the warning device deployment system 100 are protected from wear and tear.

The warning device deployment system 100 includes locking mechanism 116, a first power hinge 118, and a second power hinge 120. The locking mechanism 116 includes an electro-mechanical bolt or the like. The locking mechanism 116 can be controlled and actuated to lock and unlock the deployment case 108. For example, the locking mechanism 116 can be retracted to unlock the deployment case 108 and can be extended to lock the deployment case 108. FIG. 2 shows the locking mechanism 116 in a locked state. Thus, when the warning device deployment system 100 is closed (e.g., in the stowed state), the locking mechanism 116 locks the deployment case 108 so the deployment case 108 does not open. The locking mechanism 116 can be unlocked to open the warning device deployment system 100, as detailed further below.

The first power hinge 118 is an electro-mechanical hinge that can be controlled actuated to open and to close the deployment case 108. For example, the first power hinge 118 can pivot the deployment case 108 such that the deployment case 108 swings down to open the warning device deployment system 100. The first power hinge 118 can also pivot the deployment case 108 to swing up to close the warning device deployment system 100. The second power hinge 120 is an electro-mechanical hinge that can be controlled to open and to close the ramp 114. For example, the second power hinge 120 can pivot the ramp 114 such that the ramp 114 swings down to lower the ramp 114. In this way, the ramp 114 is opened. The second power hinge 120 can also pivot the ramp 114 to swing up to raise the ramp 114. In this way, the ramp 114 is closed.

The warning device deployment system 100 includes a deployment controller 130. The deployment controller 130 is in communication with the vehicle controller 14 and receives power from a power supply 22 of the autonomous vehicle 10. The power supply 22 includes, for example, a power distribution unit, that provides power from the autonomous vehicle 10 to the deployment controller 130 and the powered components of the warning device deployment system 100. For example, the power supply 22 can provide power from the engine or from batteries or other power sources on the autonomous vehicle 10 to the deployment controller 130 and to the components of the warning device deployment system 100 (e.g., the deployment vehicle 102, the spool arm 112, the locking mechanism 116, the first power hinge 118, and the second power hinge 120). The deployment controller 130 can provide power and communications to the deployment vehicle 102 through the wire 106 to control the deployment vehicle 102, as detailed further below. In some examples, the deployment controller 130 can communicate with the deployment vehicle 102 through wireless means (e.g., WiFi, cellular, satellite, Bluetooth, radio communication, etc.). In some examples, the deployment vehicle 102 is powered by means other than the wire 106, such as, for example, batteries or the like. The deployment controller 130 can also control the spool arm 112, the locking mechanism 116, the first power hinge 118, and the second power hinge 120, as detailed further below. In some examples, the autonomous vehicle 10 is in communication with a remote station 202 and a user can control the warning device deployment system 100, or aspects thereof, via an input device 204 at the remote station 202. For example, remote station 202 is at a remote location from the autonomous vehicle 10 and can be in communication with the vehicle controller 14 and/or directly with the deployment controller 130, thus providing control to the warning device deployment system 100, as detailed further below.

FIG. 3 illustrates a schematic, side view of the warning device deployment system 100 in a deploying state, according to an embodiment of the present disclosure. To deploy the warning devices 104, the deployment controller 130 first unlocks and opens the locking mechanism 116. For example, the deployment controller 130 retracts the locking mechanism 116 to unlock the deployment case 108. The deployment controller 130 then controls the first power hinge 118 to pivot the deployment case 108 to lower the deployment case 108 (as indicated by arrow 371). In FIG. 3, an outer surface the bottom wall 115 faces the forward side 11 of the autonomous vehicle 10 when the deployment case 108 is lowered. The deployment controller 130 then controls the second power hinge 120 to pivot the ramp 114 to lower and to open the ramp 114 (as indicated by arrow 373). When the ramp 114 is lowered, the deployment case 108 includes an open side 117 such that the deployment case 108 is opened and the deployment vehicle 102 and the warning devices 104 can be deployed out of the open side 117. The open side 117 faces the rear side 13 of the autonomous vehicle 10 when the deployment case 108 is lowered and opened. The deployment controller 130 can then deploy the deployment vehicle 102 down the ramp 114 and onto the road 30 (FIG. 1). The ramp 114 can be lowered to various heights such that the ramp 114 can be opened to any road depth or ground depth (e.g., if the autonomous vehicle 10 is on a hill, an incline or a decline, or an otherwise uneven surface).

To deploy the deployment vehicle 102, the deployment controller 130 can unlock the spool arm 112 such that the spool arm 112 is in a neutral setting. In this way, the wire 106 can be freely unwound from the spool 110. The deployment controller 130 can then control the deployment vehicle 102 to exit the deployment case 108 through the open side 117 and move down the ramp 114 and onto the road or the ground (as indicated by arrow 375). As the deployment vehicle 102 moves away from the deployment case 108, the deployment vehicle 102 pulls the wire 106 such that the warning devices 104 are deployed to the predetermined distances detailed above. For example, when the deployment vehicle 102 is at a predetermined distance from the deployment case 108, the deployment vehicle 102 causes tension in the wire 106 such that the warning devices 104 on the wire 106 are set at the predetermined distances. In this way, the wire 106 is unwound from the spool 110 a predetermined amount such that the deployment vehicle 102 causes the tension in the wire 106 when deployment vehicle 102 is at a predetermined distance from the autonomous vehicle 10 such that the warning devices 104 are deployed at the predetermined distances. The deployment controller 130 can use the deployment sensors 103, 105 to navigate the deployment vehicle 102 to ensure that the warning devices 104 are properly set at the predetermined distances. For example, the front deployment sensor 103 can provide a field of view of the environment such that the deployment controller 130 can navigate the environment. The rear deployment sensor 105 can provide a field of view of the warning devices 104 to ensure the warning devices are properly deployed and set at the predetermined distances.

In some examples, the user can control the deployment vehicle 102 via the input device 204 to deploy the warning devices 104. In some examples, the vehicle controller 14 can determine and generate a deployment vehicle path such that the deployment controller 130 can automatically navigate the deployment vehicle 102 on the generated deployment vehicle path, as detailed further below. In some examples, the vehicle sensors 12 can assist in navigating the deployment vehicle 102. For example, the vehicle sensors 12 can include a camera or other type of sensor mounted at the rear side 13 of the autonomous vehicle 10 to provide a field of view behind the autonomous vehicle 10. In this way, the deployment controller 130 or the user can use the vehicle sensors 12 to navigate the deployment vehicle 102 and to deploy the warning devices 104 behind the autonomous vehicle 10.

FIG. 4 illustrates a schematic view of the warning device deployment system 100 in a retracting state, according to an embodiment of the present disclosure. To retract the warning devices 104, the deployment controller 130 controls the deployment vehicle 102 to put the deployment vehicle 102 in a neutral setting. The deployment controller 130 then controls the spool arm 112 to retract the wire 106 and wind the wire 106 about the spool 110. By retracting the wire 106, the warning devices 104 and the deployment vehicle 102 are retracted and move towards the deployment case 108 (as indicated by arrow 481). In this way, the deployment controller 130 can retract the wire 106 such that the warning devices 104 and the deployment vehicle 102 move back up the ramp 114 and into the deployment case 108. When the warning devices 104 and the deployment vehicle 102 are in the deployment case 108, the deployment controller 130 controls the second power hinge 120 to close the ramp 114 (as indicated by arrow 483). The deployment controller 130 then controls the first power hinge 118 to close the deployment case 108 (as indicated by arrow 485).

FIG. 5 illustrates a schematic view of the warning device deployment system 100 in the stowed state, according to an embodiment of the present disclosure. When the warning devices 104 and the deployment vehicle 102 are in the deployment case 108 and the deployment case 108 has been closed, the deployment controller 130 controls the locking mechanism 116 to lock the warning device deployment system 100 (e.g., to lock the deployment case 108). In this way, the warning device deployment system 100 can be re-used to deploy the warning devices 104 as needed. For example, the deployment case 108 can be opened and the deployment vehicle 102 can deploy the warning devices 104, as detailed above.

While the warning devices 104 are described as being attached to a wire 106 herein, the warning devices 104 can be coupled to the deployment vehicle 102 by other means. For example, the warning devices 104 can be coupled to the wire 106 indirectly (e.g., using a separate coupling device). In some examples, the warning devices 104 can be coupled directly to the deployment vehicle 102 and the deployment vehicle 102 can drop the warning devices 104 at the predetermined distances. In such examples, the deployment controller 130 can communicate with the deployment vehicle 102 wirelessly (e.g., via WiFi, Bluetooth, radio communication, or the like). When the warning devices 104 are no longer needed in such examples, the deployment controller 130 can control the deployment vehicle 102 to pick up the warning devices 104 as the deployment vehicle 102 returns to the deployment case 108 to be securely stowed. In some examples, the warning device deployment system 100 can include a plurality of deployment vehicles 102 and each warning device 104 can be coupled to a separate deployment vehicle 102. Further, while the deployment vehicle 102 is shown as deploying the warning devices 104 beyond the rear side 13 (FIG. 1) of the autonomous vehicle 10, the deployment vehicle 102 can deploy the warning devices 104 to any side of the autonomous vehicle 10 and in any direction, such as, for example, the beyond the forward side 11 (FIG. 1), to the left side of the autonomous vehicle 10, and/or to the right side of the autonomous vehicle 10. In examples in which the warning devices 104 are not attached to a wire, the deployment controller 130 can control the deployment vehicle 102 to deploy the warning devices 104 at multiple sides of the autonomous vehicle 10. For example, the deployment controller 130 can control the deployment vehicle 102 to deploy warning devices 104 both in front of the autonomous vehicle 10 and behind the autonomous vehicle 10.

Figure 6:
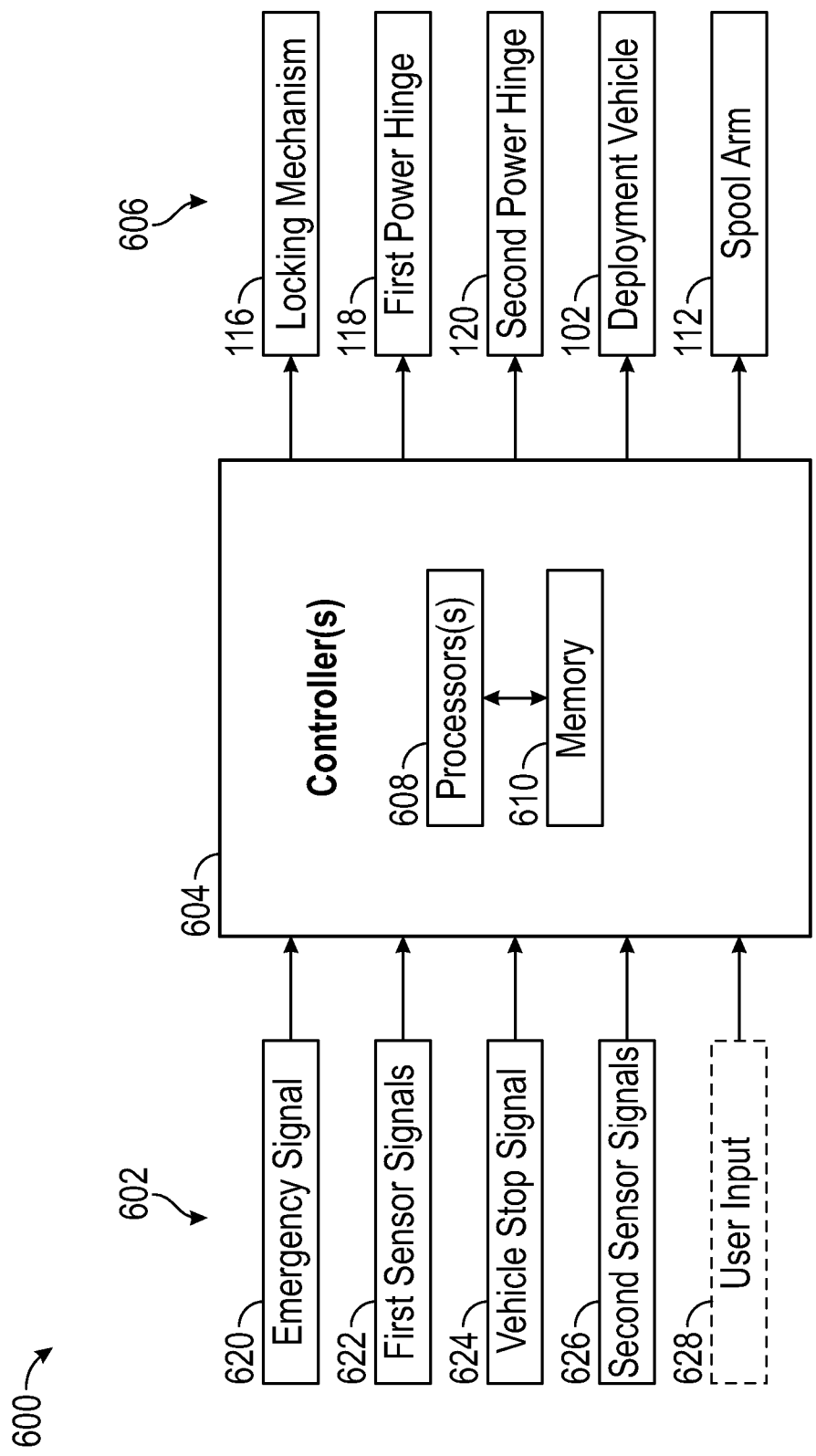
FIG. 6 illustrates a block diagram of a warning device deployment control system for the autonomous vehicle of FIG. 1, according to an embodiment of the present disclosure.

FIG. 6 illustrates a block diagram of a warning device deployment control system 600 for operation and control of at least portions of the autonomous vehicle 10, according to an embodiment of the present disclosure. The warning device deployment control system 600 includes inputs 602, one or more controllers 604, and outputs 606. The inputs 602 include an emergency signal 620, one or more first sensor signals 622 from the vehicle sensors 12, a vehicle stop signal 624, one or more second sensor signals 626 from the deployment sensors 103, 105, and user input 628 from the input device 204. The outputs 606 include the locking mechanism 116, the first power hinge 118, and the second power hinge 120, the deployment vehicle 102, and the spool arm 112. The one or more controllers 604 receive the inputs 602, implement a method of deploying warning devices 104 for an autonomous vehicle 10, and control the outputs 606, as detailed with reference to FIGS. 7 and 8 below.

The one or more controllers 604 may be one or more standalone controllers, such as the vehicle controller 14 (FIG. 1) and/or the deployment controller 130 (FIGS. 2 to 5). As depicted in FIGS. 2 to 5, the vehicle controller 14 and the deployment controller 130 are separate components. In some examples, the deployment controller 130 can be the same component as the vehicle controller 14 such that the vehicle controller 14 controls the warning device deployment system 100 directly. In this embodiment, the one or more controllers 604 include a computing device having one or more processors 608 and a memory 610. The processors 608 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 610 can include one or more computer-readable media, including, but not limited to, non-transitory computer-readable media, a computer readable non-volatile medium (e.g., a flash memory), a random access memory (RAM), a read-only memory (ROM), hard drives, flash drives, or other memory devices. A system bus couples the various components including the memory 610 to the processors 608. Portions of the one or more controllers 604 (e.g., portions of the processors 608 and/or the memory 610) may be stored on a network, such as a cloud computing network or the like.

The memory 610 can store information accessible by the processors 608, including computer-readable instructions that can be executed by the processors 608. The instructions can be any set of instructions or a sequence of instructions that, when executed by the processors 608, cause the processors 608 and the controller 604 to perform operations. The controller 604 and, more specifically, the processors 608 are programmed or configured to perform these operations, such as the operations discussed further below. In some embodiments, the instructions can be executed by the processors 608 to cause the processors 608 to complete any of the operations and functions for which the controller 604 is configured, as will be described further below. The instructions can be software written in any suitable programming language or can be implemented in hardware. Additionally, or alternatively, the instructions can be executed in logically or virtually separate threads on the processors 608. The memory 610 can further store data that can be accessed by the processors 608.

To enable user interaction with the one or more controllers 604, an input device, such as the input device 204 (FIG. 2), represents any number of input mechanisms, such as a microphone for speech, a touch-sensitive screen for gesture or graphical input, keyboard, mouse, motion input, speech and so forth. The input device can be located anywhere (e.g., remote from the autonomous vehicle 10 as shown in FIG. 2, or on the autonomous vehicle 10) and may communicate with the one or more controllers 604 by wired or wireless communication. The one or more controllers 604 can communicate with an output device. The output device can be one or more of a number of output mechanisms known to those of skill in the art, such as, for example, a display. In some instances, multimodal systems enable a user to provide multiple types of input to communicate with the one or more controllers 604. A communications interface generally governs and manages the user input and system output. There is no restriction on operating on any particular hardware arrangement and therefore the basic features here may easily be substituted for improved hardware or firmware arrangements as they are developed.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The one or more controllers 604 can include one or more communications interfaces for providing communication with the inputs 602 and the outputs 606. For example, the one or more controllers 604 can communicate with the inputs 602 and the outputs 606 through wired means or through wireless means (e.g., WiFi, cellular, satellite, Bluetooth, radio communications, etc.). In this way, the one or more controllers 604 are communicatively coupled to the vehicle sensors 12 (FIGS. 1 to 5), to the deployment sensors 103, 105 (FIGS. 2 to 5), and to the input device 204 (FIGS. 1 to 5). The one or more controllers 604 receive the inputs 602 and control the outputs 606, as detailed further below.

Figure 7:
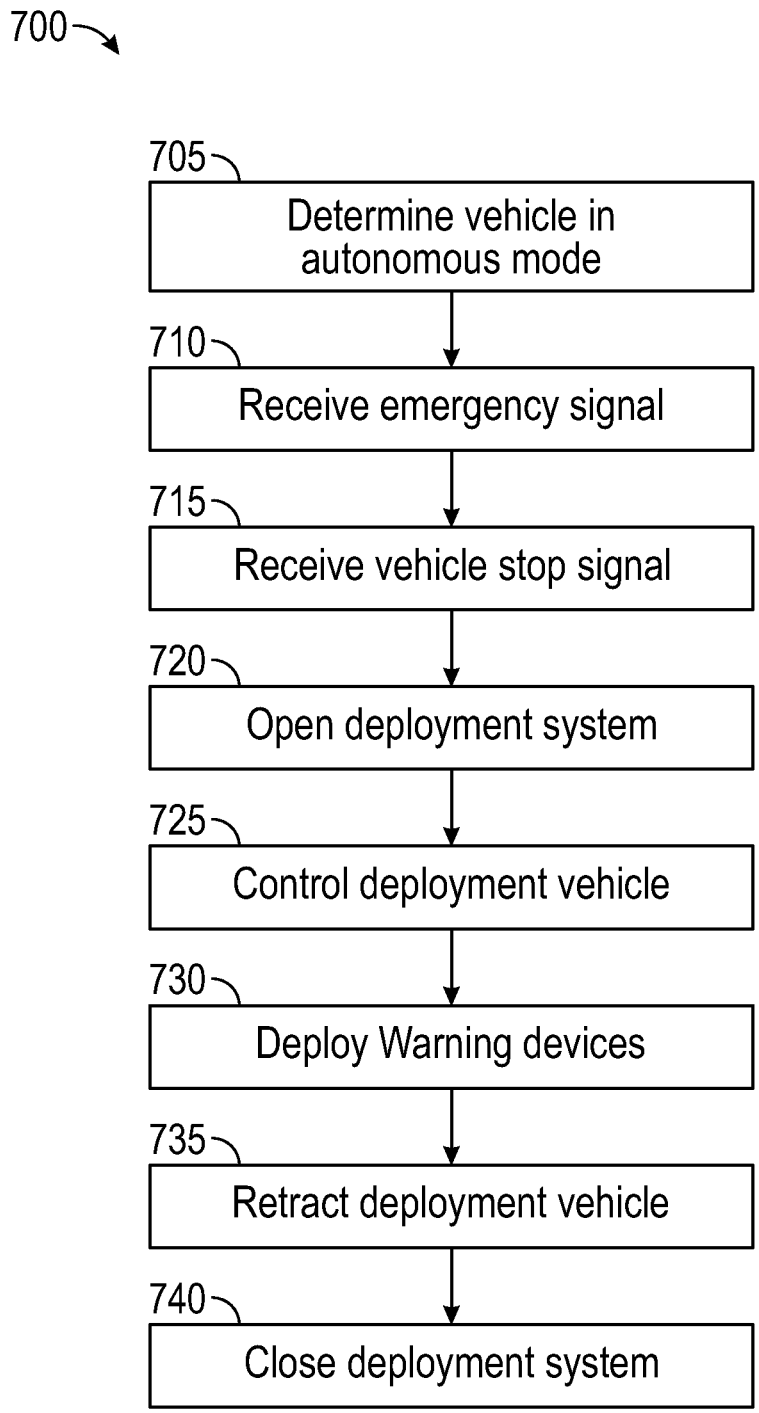
FIG. 7 is a flow diagram of a method of deploying warning devices for an autonomous vehicle, according to an embodiment of the present disclosure.

FIG. 7 is a flow diagram of a method 700 of deploying warning devices 104 for an autonomous vehicle 10, according to an embodiment of the present disclosure. In step 705, one or more controllers 604 determine that the autonomous vehicle 10 is in an autonomous mode (e.g., operating autonomously). For example, the one or more controllers 604 (e.g., the deployment controller 130) can receive a signal indicating that the autonomous vehicle 10 is in the autonomous mode. The vehicle controller 14 may send the signal to the deployment controller 130. In this way, the one or more controllers 604 determine that the autonomous vehicle 10 is in the autonomous mode.

In step 710, the one or more controllers 604 receive an emergency signal 620 (FIG. 6) indicating that the autonomous vehicle 10 is in an emergency. The emergency can include any type of emergency for the autonomous vehicle 10. For example, the emergency can include inconsistencies in sensor readings (e.g., differences between the readings in the redundant sensors), faults in the vehicle controller 14, faults in the vehicle controls 16, faults in the sensors (e.g., no longer sending or receiving information), or other emergencies or faults in the systems of the autonomous vehicle 10 that prevent the autonomous vehicle 10 from operating autonomously safely and that necessitates stopping the autonomous vehicle 10. In some examples, the vehicle controller 14 generates the emergency signal 620 in response to detecting a fault in one or more systems, vehicle controls, sensors, or controllers of the autonomous vehicle 10. The vehicle controller 14 can send the emergency signal 620 to the deployment controller 130. In this way, the deployment controller 130 detects that the autonomous vehicle 10 is in an emergency.

In step 715, the one or more controllers 604 receive a vehicle stop signal 624 (FIG. 6) indicating that the autonomous vehicle 10 has stopped. For example, when the vehicle controller 14 detects an emergency, the vehicle controller 14 can control the autonomous vehicle 10 to stop (e.g., by controlling the brakes and the steering of the autonomous vehicle 10). The autonomous vehicle 10 can stop in the current lane or the autonomous vehicle 10 can pull over to a shoulder of the road. The vehicle controller 14 can generate the vehicle stop signal 624 and send the vehicle stop signal 624 to the deployment controller 130. In this way, the deployment controller 130 detects that the autonomous vehicle 10 is stopped.

In step 720, the one or more controllers 604 open the warning device deployment system 100. For example, after the deployment controller 130 determines that the autonomous vehicle 10 is in an autonomous mode, detects that there is an emergency (e.g., receives the emergency signal 620), and detects that the autonomous vehicle 10 is stopped (e.g., receives the vehicle stop signal 624), the deployment controller 130 can open the warning device deployment system 100. With reference to FIG. 2, the deployment controller 130 controls the locking mechanism 116 to unlock the deployment case 108. The deployment controller 130 then controls the first power hinge 118 to swing open the deployment case 108 to lower the deployment case 108, and controls the second power hinge 120 to lower the ramp 114. When the deployment case 108 and the ramp 114 are open, the warning device deployment system 100 is in an opened state and the deployment vehicle 102 is ready for deployment. In some examples, a user can control the warning device deployment system 100 to open the warning device deployment system 100, for example, via the input device 204 at the remote station 202.

In step 725, the one or more controllers 604 control the deployment vehicle 102. With reference to FIG. 3, the deployment controller 130 can control the deployment vehicle 102 through the wire 106 to move down the ramp 114 and out of the deployment case 108. For example, the deployment controller 130 can propel and steer the deployment vehicle 102 via data communication and power through the wire 106.

In step 730, the one or more controllers 604 deploy the warning devices 104. With reference to FIG. 3, the deployment controller 130 deploys the warning devices 104 by controlling the deployment vehicle 102 to move the deployment vehicle 102 in a direction behind or beyond the autonomous vehicle 10. As the deployment vehicle 102 moves, the deployment vehicle 102 move the warning devices 104 with the wire 106. For example, the wire 106 may catch or otherwise hook onto the warning devices 104, as detailed above, and are moved along behind the deployment vehicle 102.

The deployment controller 130 can determine a distance the deployment vehicle 102 has travelled from deployment case 108 in order to determine when the warning devices 104 are positioned at the predetermined distances behind the autonomous vehicle 10. For example, the deployment controller 130 can determine the position of the deployment vehicle 102 by the vehicle sensors 12, the deployment sensors 103, 105, determining an amount the wire 106 has unwound from the spool 110, or by other distance determining means. In this way, the deployment controller 130 moves the deployment vehicle 102 from the autonomous vehicle 10 until the warning devices 104 are at the predetermined distances (e.g., the first warning device 104a is at the first distance D1, the second warning device 104b is at the second distance D2, and the third warning device 104c is at the third distance D3) from the autonomous vehicle 10. When the warning devices 104 are at the predetermined distances, the deployment controller 130 can stop the deployment vehicle 102. Thus, the deployment vehicle 102 is in a fully deployed state, and the warning devices 104 are deployed at the predetermined distances without a human needing to be at the autonomous vehicle 10. A user or an operator can then troubleshoot and mitigate the emergency. For example, the user can fix the fault that triggered the emergency. In some examples, the autonomous vehicle 10 can fix the fault automatically.

In step 735, the one or more controllers 604 retract the deployment vehicle 102 and the warning devices 104. With reference to FIG. 4, when the emergency has been resolved (e.g., the fault has been fixed), the deployment controller 130 shifts the deployment vehicle 102 to a neutral setting and controls the spool arm 112 to retract the wire 106, thus retracting the warning devices 104 and the deployment vehicle 102. As the spool arm 112 retracts the wire 106, the wire 106 moves the warning devices 104 and moves the deployment vehicle 102 towards the deployment case 108. The wire 106 moves the warning devices 104 and the deployment vehicle 102 up the ramp 114 and into the deployment case 108.

In step 740, the one or more controllers 604 close the warning device deployment system 100. With reference to FIGS. 4 and 5, the deployment controller 130 controls the second power hinge 120 to raise (e.g., the close) the ramp 114 and seal the deployment case 108. When the ramp 114 is raised, the deployment controller 130 controls the first power hinge 118 to raise (e.g., to close) the deployment case 108, thus closing the warning device deployment system 100. The deployment controller 130 can then actuate the locking mechanism 116 to lock the deployment case 108. Accordingly, the warning device deployment system 100 is again in the stowed state (FIG. 5) and can be re-used if another emergency arises.

In some examples, steps 720-740 can be performed without first determining the vehicle is in an autonomous mode and without first receiving an emergency signal. For example, the one or more controllers 604 can receive some other indication that the autonomous vehicle will need to deploy the warning devices 104. In some examples, a human operator can cause the warning device deployment system 100 to open and deploy the warning devices 104. For example, the user can push a button or otherwise trigger the warning device deployment system 100 to open and deploy the warning devices 104. When the warning device deployment system 100 is attached to a non-autonomous vehicle, the button or the trigger can be located inside the vehicle such that the user does not need to exit the vehicle to deploy the warning devices 104. In some examples, the human operator can send a signal to the deployment controller 130 via the input device 204 from the remote station 202 to open the warning device deployment system 100 and deploy the warning devices 104. In some examples, the user or the operator can cause the warning device deployment system 100 to retract and to close. For example, after the user has fixed the emergency, the user can push a button or otherwise trigger the warning device deployment system 100 to retract and to close. In some examples, the user can trigger the warning device deployment system 100 to retract and to close via the input device 204 from the remote station 202.

Figure 8:
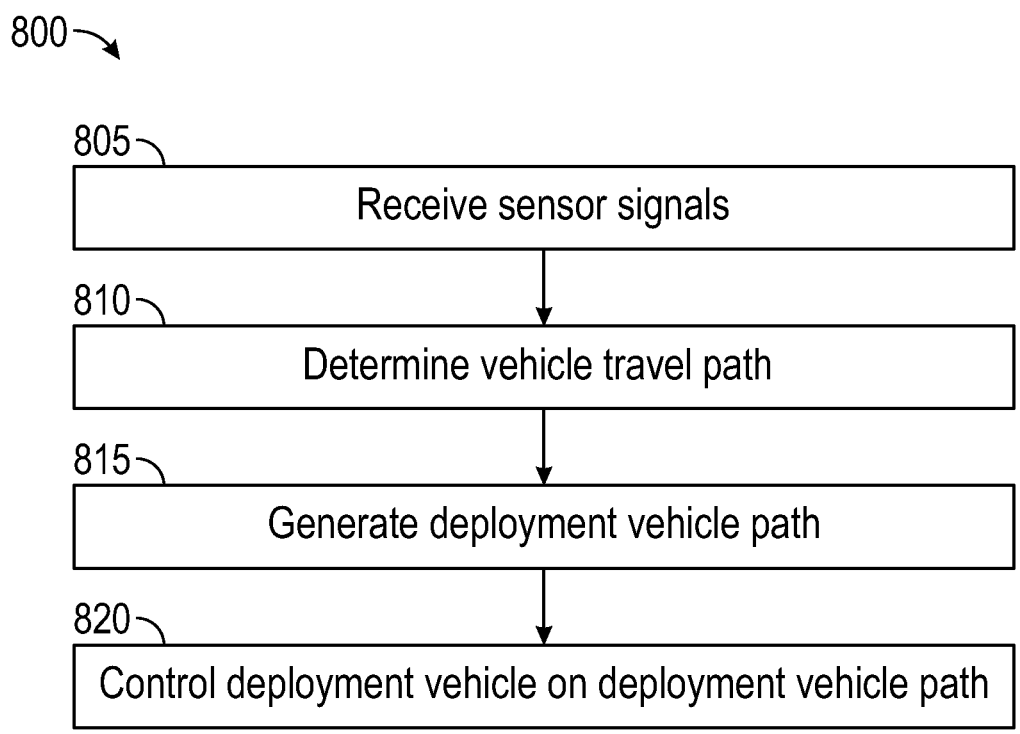
FIG. 8 is a flow diagram of a method of automatically deploying warning devices for an autonomous vehicle, according to an embodiment of the present disclosure.

FIG. 8 is a flow diagram of a method 800 of automatically deploying warning devices 104 for an autonomous vehicle 10, according to an embodiment of the present disclosure. The method 800 can be performed simultaneously to the method 700 (FIG. 7), detailed above. For example, the one or more controllers 604 (FIG. 6) perform the steps of the method 800 in parallel with the steps of the method 700. In some instances, the steps of the method 800 overlap with the steps of the method 700, as detailed further below.

In step 805, the one or more controllers 604 receive sensor signals. For example, the one or more controllers 604 receive the first sensor signals 622 from the vehicle sensors 12 as the autonomous vehicle 10 is operating and navigating on the road 30 (FIG. 1). When the autonomous vehicle 10 is in an emergency or otherwise needs to stop, the vehicle controller 14 stops the autonomous vehicle 10, as detailed above (e.g., the vehicle controller 14 initiates a fallback plan to safely stop the autonomous vehicle 10). For example, the vehicle controller 14 can stop the autonomous vehicle 10 in the current lane of the road 30 (FIG. 1) that the autonomous vehicle 10 is in or can steer the autonomous vehicle 10 onto a shoulder of the road 30 (FIG. 1) and stop the autonomous vehicle 10 on the shoulder. In some instances, the autonomous vehicle 10 turns or otherwise maneuvers while operating and/or while stopping. The one or more controllers 604 receive the sensor signals while the autonomous vehicle 10 is navigating and while the autonomous vehicle 10 is stopping. At the same time, the one or more controllers 604 can generate and/or receive the emergency signal 620 (e.g., step 710 of method 700).

In step 810, the one or more controllers 604 determine a vehicle travel path of the autonomous vehicle 10. The vehicle travel path is the path that the autonomous vehicle 10 travels or otherwise maneuvers on while operating and/or while stopping. For example, the one or more controllers 604 determine the vehicle travel path based on the sensor signals (e.g., the first sensor signals 622). As the autonomous vehicle 10 operates, the one or more controllers 604 determine a path that the autonomous vehicle 10 takes on the road 30 (FIG. 1). For example, the one or more controllers 604 determine the steering of the autonomous vehicle 10 (e.g., turned left or right), can determine a curvature of the road 30, can determine a slope (e.g., incline angle or decline angle) of the road 30, and can detect any objects in the road 30. In some examples, the vehicle travel path of the autonomous vehicle 10 includes a stopping maneuver (e.g., the path and actions that the autonomous vehicle 10 takes during a fallback plan or otherwise in an emergency) while the autonomous vehicle 10 is stopping. For example, the one or more controllers 604 can determine that the autonomous vehicle 10 turned right while stopping, turned left while stopping, remained straight while stopping, or combinations thereof. In this way, the one or more controllers 604 determine a curvature of the road, determine a slope of the road, and determine whether there are other objects in the road while the autonomous vehicle 10 is operating and/or while the autonomous vehicle 10 is stopping.

In step 815, the one or more controllers 604 generate a deployment vehicle path for the deployment vehicle 102. The one or more controllers 604 can generate the deployment vehicle path after the autonomous vehicle 10 has stopped or can simultaneously generate the deployment vehicle path while the autonomous vehicle 10 is operating, navigating, and/or stopping. For example, the one or more controllers 604 may generate and/or receive the vehicle stop signal 624 (e.g., step 715 of the method 700). The one or more controllers 604 can generate the deployment vehicle path based on the vehicle travel path of the autonomous vehicle 10. For example, the one or more controllers 604 generate the deployment vehicle path based on whether the autonomous vehicle 10 turned while operating, based on curvature of the road, based on slope of the road, based on any objects in the road, or combinations thereof. The deployment vehicle path is generated such that the warning device deployment system 100 automatically deploys the warning devices 104 at the predetermined distances. In some examples, the one or more controllers 604 can generate the deployment vehicle path based on the vehicle stopping maneuver of the autonomous vehicle 10. For example, the one or more controllers 604 generate the deployment vehicle path based on whether the autonomous vehicle 10 turned while stopping, based on curvature of the road while stopping, based on slope of the road while stopping, based on any objects in the road while stopping, or combinations thereof.

In step 820, the one or more controllers 604 control the deployment vehicle 102 on the deployment vehicle path. For example, after the warning device deployment system 100 is opened (e.g., step 720 of the method 700), the one or more controllers 604 automatically control the deployment vehicle 102 (e.g., step 725 of the method 700) to follow the deployment vehicle path. In this way, the one or more controllers 604 automatically control the warning device deployment system 100 to automatically deploy the warning devices 104.

The systems and methods detailed herein provide for deploying warning devices from an autonomous vehicle using a deployment vehicle. The warning device deployment system can generate a deployment path for the RC vehicle and can automatically control the RC vehicle on the deployment path such that the warning devices are setup at the predetermined distance from the autonomous vehicle even if the autonomous vehicle stopped on a curve, the road is curved, the road is sloped, there are objects in the road, etc. Thus, the systems and methods of the present disclosure provide for deploying and retracting warning devices without the need of a human to be present at the autonomous vehicle. Accordingly, the systems and methods herein can provide for an improved warning device deployment system that deploys warning devices in a timely manner and at required distances from the autonomous vehicle to provide warnings to other road uses, and, thus, improves road safety.

Further aspects of the present disclosure are provided by the subject matter of the following clauses.

A method of deploying warning devices for a vehicle includes deploying one or more warning devices from the vehicle, the one or more warning devices being coupled to a deployment vehicle. Deploying the one or more warning devices includes controlling the deployment vehicle.

The method of the preceding clause, further comprising detecting that the vehicle is in an emergency prior to deploying the one or more warning devices.

The method of any preceding clause, further comprising detecting that the vehicle is stopped prior to deploying the one or more warning devices.

The method of any preceding clause, further comprising controlling the deployment vehicle to deploy the one or more warning devices to a predetermined distance from the vehicle.

The method of any preceding clause, the one or more warning devices being coupled to a wire, the wire being attached to the deployment vehicle, the method further comprising controlling the deployment vehicle to pull the wire to deploy the one or more warning devices.

The method of any preceding clause, further comprising retracting the one or more warning devices and the deployment vehicle.

The method of any preceding clause, further comprising stowing the one or more warning devices and the deployment vehicle in a deployment case attached to the vehicle.

The method of any preceding clause, the deployment case including a ramp, the method further comprising lowering the ramp and controlling the deployment vehicle down the ramp to deploy the one or more warning devices.

The method of any preceding clause, the vehicle being an autonomous vehicle.

The method of any preceding clause, the deploying the one or more warning devices including deploying the one or more warning devices when the vehicle is in an emergency.

A system for deploying warning devices for a vehicle. The system comprises a deployment vehicle, one or more warning devices coupled to the deployment vehicle, and a controller configured to: deploy the one or more warning devices from the vehicle, wherein deploying the one or more warning devices includes the controller configured to control the deployment vehicle.

The system of the preceding clause, the controller being configured to detect that the vehicle is in an emergency prior to deploying the one or more warning devices.

The system of any preceding clause, the controller being configured to detect that the vehicle is stopped prior to deploying the one or more warning devices.

The system of any preceding clause, the controller being configured to control the deployment vehicle to deploy the one or more warning devices to a predetermined distance.

The system of any preceding clause, further comprising a wire attached to the deployment vehicle, the one or more warning devices being coupled to the wire, the deployment vehicle pulling the wire to deploy the one or more warning devices.

The system of any preceding clause, the controller being configured to retract the one or more warning devices and the deployment vehicle.

The system of any preceding clause, further comprising a deployment case attached to the vehicle, the one or more warning devices and the deployment vehicle being stowed in the deployment case.

The system of any preceding clause, the deployment case including a ramp, and the controller being configured to lower the ramp and control the deployment vehicle down the ramp to deploy the one or more warning devices.

The system of any preceding clause, the vehicle being an autonomous vehicle.

The system of any preceding clause, the controller being configured to deploy the one or more warning devices when the vehicle is in an emergency.

A vehicle comprising a warning device deployment system. The warning device deployment system comprising a deployment vehicle, one or more warning devices coupled to the deployment vehicle, and a controller configured to: deploy the one or more warning devices from the vehicle, wherein deploying the one or more warning devices includes the controller configured to control the deployment vehicle.

The vehicle of the preceding clause, the controller being configured to detect that the vehicle is in an emergency prior to deploying the one or more warning devices.

The vehicle of any preceding clause, the controller being configured to detect that the vehicle is stopped prior to deploying the one or more warning devices.

The vehicle of any preceding clause, the controller being configured to control the deployment vehicle to deploy the one or more warning devices to a predetermined distance.

The vehicle of any preceding clause, the warning device deployment system further comprising a wire attached to the deployment vehicle, the one or more warning devices being coupled to the wire, the deployment vehicle pulling the wire to deploy the one or more warning devices.

The vehicle of any preceding clause, the controller being configured to retract the one or more warning devices and the deployment vehicle.

The vehicle of any preceding clause, further comprising a deployment case attached to the vehicle, the one or more warning devices and the deployment vehicle being stowed in the deployment case.

The vehicle of any preceding clause, the deployment case including a ramp, and the controller being configured to lower the ramp and control the deployment vehicle down the ramp to deploy the one or more warning devices.

The vehicle of any preceding clause, further comprising a tractor unit that is configured to pull a trailer, the warning device deployment system being coupled to the tractor unit.

The vehicle of any preceding clause, the vehicle being an autonomous vehicle.

The vehicle of any preceding clause, the controller being configured to deploy the one or more warning devices when the vehicle is in an emergency.

A method of automatically deploying warning devices for a vehicle. The method comprising determining a vehicle travel path of the vehicle, generating a deployment vehicle path for a deployment vehicle based on the vehicle travel path, and automatically deploying one or more warning devices from the vehicle by controlling the deployment vehicle on the deployment vehicle path.

The method of the preceding clause, the determining the vehicle travel path including receiving sensor signals from one or more vehicle sensors of the vehicle, and determining the vehicle travel path based on the sensor signals.

The method of any preceding clause, the determining the vehicle travel path including determining a path that the vehicle takes while the vehicle is stopping.

The method of any preceding clause, the determining the vehicle travel path including determining a curvature of a road, determining a slope of the road, or detecting objects in the road.

The method of any preceding clause, further comprising generating the deployment vehicle path based on the curvature of the road, based on the slope of the road, or based on the objects in the road.

The method of any preceding clause, the generating the deployment vehicle path including generating the deployment vehicle path to deploy the one or more warning devices at a predetermined distance from the vehicle.

The method of any preceding clause, the automatically deploying the one or more warning devices including automatically deploying the one or more warning devices to the predetermined distance from the vehicle.

The method of any preceding clause, the vehicle being an autonomous vehicle.

The method of any preceding clause, the determining the vehicle travel path including determining a path that the vehicle takes while the vehicle is in an emergency.

A system for automatically deploying warning devices for a vehicle. The system comprises a deployment vehicle, one or more warning devices coupled to the deployment vehicle, and a controller configured to: determine a vehicle travel path of the vehicle; generate a deployment vehicle path for the deployment vehicle based on the vehicle travel path; and automatically deploy the one or more warning devices from the vehicle by controlling the deployment vehicle on the deployment vehicle path.

The system of the preceding clause, the determining the vehicle travel path including the controller configured to receive sensor signals from one or more vehicle sensors of the vehicle, and determine the vehicle travel path based on the sensor signals.

The system of any preceding clause, the determining the vehicle travel path including the controller configured to determine a path that the vehicle takes while the vehicle is stopping.

The system of any preceding clause, the determining the vehicle travel path including the controller configured to determine a curvature of a road, determine a slope of the road, or detect objects in the road.

The system of any preceding clause, the controller being configured to generate the deployment vehicle path based on the curvature of the road, based on the slope of the road, or based on the objects in the road.

The system of any preceding clause, the generating the deployment vehicle path including the controller configured to generate the deployment vehicle path to deploy the one or more warning devices at a predetermined distance from the vehicle.

The system of any preceding clause, the automatically deploying the one or more warning devices including the controller configured to automatically deploy the one or more warning devices to the predetermined distance from the vehicle.

The system of any preceding clause, the vehicle being an autonomous vehicle.

The system of any preceding clause, the determining the vehicle travel path including the controller configured to determine a path that the vehicle takes while the vehicle is in an emergency.

A vehicle comprising a warning device deployment system. The warning device deployment system comprising a deployment vehicle, one or more warning devices coupled to the deployment vehicle, and a controller configured to: determine a vehicle travel path of the vehicle; generate a deployment vehicle path for the deployment vehicle based on the vehicle travel path; and automatically deploy the one or more warning devices from the vehicle by controlling the deployment vehicle on the deployment vehicle path.

The vehicle of the preceding clause, further including one or more vehicle sensors, the determining the vehicle travel path including the controller configured to receive sensor signals from the one or more vehicle sensors, and determine the vehicle travel path based on the sensor signals.

The vehicle of any preceding clause, the determining the vehicle travel path including the controller configured to determine a path that the vehicle takes while the vehicle is stopping.

The vehicle of any preceding clause, the determining the vehicle travel path including the controller configured to determine a curvature of a road, determine a slope of the road, or detect objects in the road.

The vehicle of any preceding clause, the controller being configured to generate the deployment vehicle path based on the curvature of the road, based on the slope of the road, or based on the objects in the road.

The vehicle of any preceding clause, the generating the deployment vehicle path including the controller configured to generate the deployment vehicle path to deploy the one or more warning devices at a predetermined distance from the vehicle.

The vehicle of any preceding clause, further comprising a tractor unit that is configured to pull a trailer, the warning device deployment system being coupled to the tractor unit.

The vehicle of any preceding clause, the vehicle being an autonomous vehicle.

The vehicle of any preceding clause, the determining the vehicle travel path including the controller configured to determine a path that the vehicle takes while the vehicle is in an emergency.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A method of deploying warning devices for a vehicle, the method comprising:
   deploying one or more warning devices from the vehicle, the one or more warning devices being coupled to a deployment vehicle by a wire, wherein deploying the one or more warning devices includes controlling the deployment vehicle; and
   retracting the wire to retract the one or more warning devices and the deployment vehicle towards the vehicle.

2. The method of claim 1, further comprising detecting that the vehicle is in an emergency prior to deploying the one or more warning devices.

3. The method of claim 1, further comprising detecting that the vehicle is stopped prior to deploying the one or more warning devices.

4. The method of claim 1, further comprising controlling the deployment vehicle to deploy the one or more warning devices to a predetermined distance from the vehicle.

5. The method of claim 1, wherein the one or more warning devices are coupled to the wire, the wire being attached to the vehicle and the deployment vehicle, the method further comprising controlling the deployment vehicle to pull the wire to deploy the one or more warning devices.

6. The method of claim 1, further comprising stowing the one or more warning devices and the deployment vehicle in a deployment case attached to the vehicle.

7. The method of claim 6, wherein the deployment case includes a ramp, the method further comprising lowering the ramp and controlling the deployment vehicle down the ramp to deploy the one or more warning devices.

8. The method of claim 1, wherein the vehicle is an autonomous vehicle.

9. The method of claim 1, wherein deploying the one or more warning devices includes deploying the one or more warning devices when the vehicle is in an emergency.

10. A system for deploying warning devices for a vehicle, the system comprising:
- a deployment vehicle;
- one or more warning devices coupled to the deployment vehicle;
- a wire that couples the one or more warning devices to the deployment vehicle; and
- a controller configured to:
    - deploy the one or more warning devices from the vehicle, wherein deploying the one or more warning devices includes the controller configured to control the deployment vehicle; and
    - retract the wire to retract the one or more warning devices and the deployment vehicle towards the vehicle.

11. The system of claim 10, wherein the controller is configured to detect that the vehicle is in an emergency prior to deploying the one or more warning devices.

12. The system of claim 10, wherein the controller is configured to detect that the vehicle is stopped prior to deploying the one or more warning devices.

13. The system of claim 10, wherein the controller is configured to control the deployment vehicle to deploy the one or more warning devices to a predetermined distance.

14. The system of claim 10, wherein the wire is attached to the deployment vehicle, the one or more warning devices being coupled to the wire, wherein the deployment vehicle pulls the wire to deploy the one or more warning devices.

15. The system of claim 10, further comprising a deployment case attached to the vehicle, wherein the one or more warning devices and the deployment vehicle are stowed in the deployment case.

16. The system of claim 15, wherein the deployment case includes a ramp, and the controller is configured to lower the ramp and control the deployment vehicle down the ramp to deploy the one or more warning devices.

17. The system of claim 10, wherein the vehicle is an autonomous vehicle.

18. The system of claim 10, wherein the controller is configured to deploy the one or more warning devices when the vehicle is in an emergency.

19. A vehicle comprising:
- a warning device deployment system comprising:
    - a deployment vehicle;
    - one or more warning devices coupled to the deployment vehicle;
    - a wire that couples the one or more warning devices to the deployment vehicle; and
    - a controller configured to:
        - deploy the one or more warning devices from the vehicle, wherein deploying the one or more warning devices includes the controller configured to control the deployment vehicle; and
        - retract the wire to retract the one or more warning devices and the deployment vehicle towards the vehicle.

20. The vehicle of claim 19, wherein the controller is configured to detect that the vehicle is in an emergency prior to deploying the one or more warning devices.

21. The vehicle of claim 19, wherein the controller is configured to detect that the vehicle is stopped prior to deploying the one or more warning devices.

22. The vehicle of claim 19, wherein the controller is configured to control the deployment vehicle to deploy the one or more warning devices to a predetermined distance.

23. The vehicle of claim 19, wherein the wire is attached to the deployment vehicle, the one or more warning devices being coupled to the wire, wherein the deployment vehicle pulls the wire to deploy the one or more warning devices.

24. The vehicle of claim 19, further comprising a deployment case attached to the vehicle, wherein the one or more warning devices and the deployment vehicle are stowed in the deployment case.

25. The vehicle of claim 24, wherein the deployment case includes a ramp, and the controller is configured to lower the ramp and control the deployment vehicle down the ramp to deploy the one or more warning devices.

26. The vehicle of claim 19, further comprising a tractor unit that is configured to pull a trailer, wherein the warning device deployment system is coupled to the tractor unit.

27. The vehicle of claim 19, wherein the vehicle is an autonomous vehicle.

28. The vehicle of claim 19, wherein the controller is configured to deploy the one or more warning devices when the vehicle is in an emergency.

* * * * *